United States Patent Office 3,360,134
Patented Dec. 26, 1967

3,360,134
CARBON-COATED ALUMINA AND PROCESS FOR MAKING SAME
Joseph B. Pullen, Alexandria, Va., assignor to Chem-Seek, Inc., Alexandria, Va., a corporation of Virginia
No Drawing. Filed Dec. 2, 1966, Ser. No. 598,596
11 Claims. (Cl. 210—502)

ABSTRACT OF THE DISCLOSURE

Discrete grains of activated alumina hydrate impregnated with activated carbon. The product is made by contacting activated alumina hydrate particles with a liquid containing a carbonaceous material capable of thermal degradation to activated carbon and by subsequently heating the particles to deposit activated carbon throughout the pores of each particle. The product has good adsorption and catalytic properties and is particularly effective as a decolorizing agent and a reviving agent for precious metal electroplating bath.

This is a continuation-in-part of application Ser. No. 343,234, filed Feb. 7, 1964 now abandoned.

Disclosure

This invention relates to a unique composition of alumina and carbon having adsorption and catalytic properties, to the process of manufacturing the composition and to methods of using the composition.

More specifically, the invention relates to an activated alumina hydrate in the form of discrete particles having activated carbon distributed or impregnated in the particles and tightly bound to said particles, the carbon content constituting, by weight, from about 2% to about 15% of the product.

The term alumina hydrate as employed herein refers to $Al_2O_3$ with variable proportions of hydroxide groups and hydroxyoxide groups. Technically, the compounds do not contain water of hydration, although the expression "hydrate" is in common usage. The compounds exist in crystalline form, and currently the following varieties have been identified: $\alpha$-alumina trihydrate (gibbsite), $\beta$-alumina trihydrate (bayerite), a more recently discovered $\beta$-alumina trihydrate (nordstrandite), $\alpha$-alumina monohydrate (boehmite), and $\beta$-alumina monohydrate. All of these compounds lose water of constitution when heated and will be converted to various transition products, depending on the grain size of the initial hydrate, the temperature, time and rate of heating and the surrounding vapor pressure. The stable anhydrous $Al_2O_3$ is produced at about 1100° C.

The term activated alumina hydrate as employed herein refers to a granular or powdered form of an alumina hydrate and particularly transition products thereof, as defined above, characterized by large surface area per unit weight and very fine pores and having preferential adsorptive characteristics and catalytic properties. The activated products may be made in several different ways and vary in physical characteristics and particularly in the selectivity of the adsorption characteristics. By way of illustration, one common activated alumina hydrate is formed by partially dehydrating the $\alpha$-trihydrate by heating it to a temperature of about 400° C. in a current of air or other gas, to prevent it from remaining for long in the steam formed during loss of water. The resulting product contains a proportion of $\alpha$-alumina monohydrate, usually about 20 to 40%, with the remainder being one or more of the partially crystalline transition products of undetermined bound water content. The product contains about 6–8% water of constitution based on a loss-on-ignition test.

When the initial trihydrate has been obtained by precipitation from raw sodium aluminate solution (Bayer process alumina hydrate), the product generally contains 0.5 to 0.8% $Na_2O$ and a few hundred parts per million of $SiO_2$ and $Fe_2O_3$. The surface area is typically 200 to 250 m.$^2$/g. (square meters per gram), the pore volume is typically 0.2 to 0.25 cm.$^3$/g. (cubic centimeters per gram), and the pore diameter is typically about 40 to 50 A. A common form of chromatographic grade activated alumina hydrate is produced from this type of activated alumina hydrate by washing the latter in dilute sulfuric acid, rinsing with water and drying to less than a few percent free water.

The term activated carbon as employed herein refers to any form of carbon characterized by a large surface area per unit of weight and having high adsorptive characteristics. These products are generally produced by the destructive distillation or thermal decomposition or by selective oxidation of various naturally occurring carbonaceous materials, although some of them may be prepared by chemical processes. Typically they exhibit surface areas ranging from about 300 to about 2000 m.$^2$/g.

The above definitions are consistent with definitions in common use. They are given here as an aid in fully understanding the present invention, because the present invention employs some of these materials while excluding various other materials of apparently similar but unsuitable nature.

As previously indicated, the composition of the present invention is a granular activated alumina hydrate having activated carbon impregnated in and firmly bound to the discrete particles of the hydrate. The composition is pourable in the sense that the particles are not adhered to each other by a binder or by excess carbon. The activated carbon is an integral part of each particle and is not dislodged or otherwise rubbed off during pouring or handling. Preferably, the activated carbon is uniformly impregnated throughout the entire volume of each particle when the composition is employed as a decolorizing agent or as a cleanup agent for precious metal solutions. For some purposes it may not be necessary that the particles be impregnated all the way to their cores. When the composition is employed as a catalyst it may be desirable to include a small portion of metal, metal compound or non-metal compound with the carbon.

The carbon content of the composition varies from, by weight, about 2% to about 15%, depending on the nature of the alumina hydrate employed, and on the proportion of carbonaceous material employed. The use of non-acid-washed hydrates generally yields a composition of relatively low carbon content, because complete impregnation of the hydrate particles does not always occur. With acid-washed hydrates the particles tend to become impregnated all the way to their cores, and the composition will contain 7 to 15% carbon.

The physical properties of the composition are substantially the same as those of the activated alumina hydrate particles. That is, the composition retains the average pore diameter and total surface area of the original hydrate particles. However, the adsorbent and catalytic properties of the composition are unique and are not merely the sum of the properties of activated alumina hydrate and activated carbon.

The composition of the present invention is prepared by contacting an activated alumina hydrate in granular form with a liquid phase carbonaceous material capable of thermal degradation to an activated carbon and thereafter heating the particles of the hydrate to a temperature and for a period of time sufficient to convert the carbonaceous material to activated carbon and insufficient to remove all the water of constitution from the hydrate. Preferably, the heat treatment will be controlled so as not to effect any appreciable change in the crystal structure or bound water content in the hydrate.

In general, temperatures of 400° C. to 750° C. may be employed. The reaction is carried out in a substantially oxygen-free atmosphere and all volatile products are removed as they are formed. Generally, some agitation during the reaction is desired to aid in liberating volatile constituents and to inhibit agglomeration. The product, still in the form of discrete particles or grains, is cooled and stored in an atmosphere which is substantially free of oxygen and water.

The carbonaceous materials which may be employed are those which can be converted to activated carbon by heating and which are consistent with the requirement that the alumina hydrate particles be contacted with the carbonaceous material in liquid phase. The material may be a liquid carbonaceous compound or a solution or fine dispersion of a carbonaceous compound in a volatile or decomposable solvent. In practice it has been found preferable and economical to use carbohydrate material such as ordinary sucrose either as an aqueous solution or in solid form. When a solution or liquid is employed, the alumina hydrate particles are dried prior to the heating step. When solid sucrose is employed, the sugar melts in its own water of crystallization during the heating step and is absorbed into the alumina hydrate without the need for an intermediate drying step. Carbonaceous materials such as other sugars, molasses and starch may also be employed alone or in combination with themselves or with sucrose, either as solutions or in their natural forms.

The activated alumina hydrate may be of the previously described common type formed by partial thermal dehydration of $\alpha$-alumina trihydrate. Alternatively, the hydrate may be formed by some other process, such as the thermal decomposition and partial dehydration of aluminum salts of organic acids, including aluminum acetate, aluminum formate, aluminum oxalate, and certain inorganic aluminum compounds including aluminum hydroxide and aluminum carbonate. Properties such as surface area, pore size, selectivity of adsorption and selectivity of catalytic action vary with the nature of the starting material and the details of the process by which it is converted to an activated hydrate, and different hydrates will be employed for different end uses. For good impregnation the surface area of the grains should be about at least 100 m.²/g. and the particle size should be such that 0.06% are retained on a +100 mesh screen, 70–88% are retained on a +200 mesh screen and 90–100% are retained on a +325 screen. The bound water content, as indicated by loss on ignition, should be something less than about 35%, the bound water content of the trihydrate. Generally, a hydrate having a loss on ignition (at 1000° C. for one hour) of less than about 20%, or a hydrate containing up to about 25% bound water is suitable.

When the composition of the invention is to be employed as a decolorizing agent or precious metal clean-up agent, it is preferred to employ a chromatographic grade activated alumina hydrate, that is, a hydrate which has been thermally activated and which has been subsequently acid washed, as with dilute sulfuric acid. In particular, it is preferred to employ a special acid-washed hydrate which has been activated from alumina trihydrate by heating the latter to partially dehydrate it to a product having a boehmite phase and a loss on ignition (1000° C. for one hour) of about 12–17%, the boehmite phase being indicated by a boehmite ($\alpha$-alumina monohydrate) X-ray diffraction peak which is 20–35% of the peak which would be obtained with pure boehmite. The preferred final product, from the standpoint of good adsorption properties, consists of this special hydrate with activated carbon impregnated completely and uniformly therethrough, the carbon being present in an amount ranging from about 2% to about 15%, by weight.

It will be appreciated from the above discussion that alumina gel and anhydrous alumina are not employed in marking the composition of the present invention unless, of course, they are first converted to an activated hydrate. It will be apparent, also, that unactivated hydrates such as naturally occurring alumina hydrates and fully hydrated aluminas are not employed unless, of course, they are first activated as by partial dehydration and acid washing.

The initial proportions of activated alumina hydrate and carbonaceous material which are mixed and heated to form the final product may vary considerably. As previously indicated, the non-acid-washed activated alumina hydrates generally do not take up as much carbon as do the acid-washed activated hydrates. Accordingly, a lesser amount of carbonaceous material will be employed when the hydrate is non-acid washed than when the hydrate has been acid-washed. The lower limit of carbonaceous material should be sufficient to yield a product containing about 2% activated carbon, taking into account any carbon losses which may occur due to volatilization, oxidation and other causes. The upper limit of carbonaceous material initially employed should be sufficient to yield a product containing about 15% activated carbon. Excess carbonaceous material should be avoided so that the alumina hydrate particles do not become embedded in the activated carbon, so that loose particles of carbon do not adhere to the hydrate particles, and so that the pores in the hydrate particles do not become plugged with carbon. When employing solid sucrose and an acid-washed hydrate a ratio of about ½ to 4 parts by weight of sucrose to 10 parts by weight of the hydrate is used, with the preferred ratio being about 2 parts sucrose to 10 parts hydrate.

Referring now to the details of the heating operation, it is important that the mixture contain little or no free water by the time that it is subjected to high temperature, otherwise spattering and fracturing of the hydrate particles may occur. Any free water in the hydrate particles may be removed by a prior drying step carried out at, for example, 100° C., or the heating of the mixture of particles and carbonaceous material may be begun slowly so as to allow the water to volatilize and pass off. When the particles have been contacted with an aqueous solution of the carbonaceous material, it will usually be desirable to dry the soaked particles before subjecting them to the heating operation. When solid sucrose is employed, it may be mixed with the hydrate particles and sent directly to the heating operation. The sucrose melts in its own water of crystallization, and the water is soon volatilized without adverse affects, provided that the rate of heating is not too high.

The heating operation should be carried out as rapidly as possible in order not to alter the physical properties obtained by the original activation of the alumina hydrate, as by driving off water of constitution. A reaction time of about one minute is preferred, although good results have been obtained with reaction times of ten minutes.

The composition has been found to be very useful in diverse ways, including:

(1) decolorization of sugar solutions;
(2) treatment of electroplating baths;
(3) removal of constituents from cigarette smoke;
(4) separation of organic contaminants from gasoline;
(5) as an adsorbent in pressure or gravity flow percolation beds;
(6) purification of pharmaceuticals;
(7) chromatographic separations;
(8) as a catalyst or catalyst support.

When employed as an adsorbent the composition is placed and retained in a tube or column and the liquid or gas to be treated is passed through the column. Regeneration may be effected in any of the ways known in the art, as by eluting the adsorbed material with a suitable solvent or by heating the composition in an inert atmosphere to expel the adsorbed material.

The invention will be further described in connection with the following examples:

Example 1

A 100-gram sample of a commercially procured chromatographic acid-washed aluminum oxide (an alumina hydrate) was intimately blended with 20 grams of industrial sucrose. The sucrose was first ground to about the consistency of the alumina hydrate to prevent stratification of the two solid substances during blending. The two mixed solids were poured into a porcelain crucible and the crucible was then immersed in a bed of sea sand contained in an electric furnace. Sand temperature was about 700° C. at the time of immersion. The sucrose soon melted, turned brown and then soaked into the particles. Upon continued heating, the carbonization occurred. The mix was stirred with a stainless steel spatula during caramelization and carbonization of the sugar and a constant inert atmosphere was maintained by playing a stream of nitrogen over the top of the crucible during sugar decomposition and water vapor evolution, both from sugar by-product water and from alumina dehydration. After the mass had become placid and water vapor evolution had ceased, and the mass had become incandescent, it was removed and stored in a glass-stoppered Pyrex flask to exclude air and ambient moisture.

The product was hard, granular, free flowing and black in color. No dust was observed during handling, and no carbon smudge was observed when the granules were rubbed between the fingers.

Example 2

A special chromatographic, acid-washed (in dilute sulfuric acid) alumina hydrate was obtained which had the following properties:

| | |
|---|---|
| Loss on ignition (1000° C./1 hr.) __percent__ | 12–17 |
| Residual sulfate ion (remaining from the acid wash) _____percent__ | 2–5 |
| BET surface area _____m.$^2$/gm__ | 180–225 |
| BET pore volume _____cc./gm__ | 0.18–0.30 |
| Boehmite phase (X-ray diffraction) _percent__ | 20–30 |
| pH (5 gm. sample slurried in 50 gm. water at 25–30° C. for 30 min.) _____ | 3.9–4.3 |
| Brockman activity (standard method) _____ | Less than group II |
| Particle size screen analysis: | |
| Retained on +100 mesh screen _percent__ | 0.0–6 |
| Retained on +200 mesh screen __do____ | 70–88 |
| Retained on +325 mesh screen __do____ | 90–100 |

The hydrate was formed by partially dehydrating α-alumina trihydrate in a rotary drier by counter-current flow with a heated gas at an inlet temperature of about 1200° F. and an outlet temperature of about 380° F. The resulting activated alumina was washed with 5% sulfuric acid, rinsed with water and dried to about 2% free water content.

Solid sucrose was ground to about the same fineness as the alumina hydrate. Twenty grams of the ground sucrose were mixed uniformly with 100 grams of the hydrate and were fed by means of a vibratory feeder to an inclined rotating tube. The tube was heated externally with a gas burner. The burner output, feed rate and tube rotation were adjusted to effect a one minute residence of the mixture in the tube at 700° C.

The sucrose melted, caramelized, soaked into the hydrate particles and decomposed into activated carbon. The resulting granules were continuously recovered from the discharge end of the tube which was disposed within a chamber. Nitrogen was continuously introduced into the chamber to make up for air which would otherwise enter as a result of convection.

The product had the same appearance as the product of Example 1 and had the following physical properties:

| | |
|---|---|
| pH _____ | Neutral. |
| Adsorption efficiency (as determined by the Freundlich Equation) _____ | 56%. |
| Average pore size _____ | 207 microns (65 mesh). |
| BET surface area _____ | 215 m.$^2$/g. |
| Pore radius _____ | 2 A. |
| Total pore volume _____ | 0.24 ml./cc. |
| Carbon content _____ | 11%. |
| Alumina hydrate content _____ | 89%. |
| Extent of carbon impregnation _____ | All the way to the core of each particle. |

Example 3

One hundred grams of a commercially available non-acid-washed activated alumina hydrate of approximately the same particle size range as employed in Example 2 was mixed with 20 grams of ground sucrose and carbonized as in Example 2. The hydrate granules were of the kind previously described, which result from the thermal partial dehydration of Bayer process alumina hydrate. The carbonized product was the same in appearance as the products of Examples 1 and 2 except that it was brown or grey in color rather than black, showing that less carbon had become deposited in all and on the hydrate particles. Upon examination of the granules it was found that their cores were white.

Example 4

The procedure of Example 2 was repeated except that calcined alumina, that is, alumina having no water of constitution was used. The sucrose carbonized but did not penetrate or even adhere to the alumina particles. The product was therefore unsuitable in that it was merely a mechanical mixture of alumina and carbon.

Example 5

A rhodium plating bath, containing 6.45 ounces troy of rhodium per gallon, was in a contaminated condition as a result of extensive plating operations, yielding a stressed plating deposit, which was brittle and tended to crack. The spent bath was divided into two equal portions. One portion was treated with activated charcoal. After treatment in a conventional manner with commercial activated charcoal, the treated solution contained only 5.90 ounces troy of rhodium per gallon and was still unsatisfactory as a plating bath. The other portion was treated with the product of Example 2. The resulting solution contained 6.35 ounces troy of rhodium and was returned to its original prime efficiency and yielded a bright non-stressed deposit. Rhodium loss to the adsorbent was less than one fifth the loss when charcoal was used, and what is more important, the usefulness of the bath was restored.

Example 6

After operation for the normal life of the bath contaminated acid gold plating solution containing 0.3 ounce troy of gold per gallon yielded a dull, unacceptable deposit. When treated with commercial activated charcoal, the gold concentration was reduced to 0.1 ounce troy per gallon with no improvement in the quality of the gold deposit. A portion of the same contaminated acid gold solution containing 0.3 ounce troy per gallon was treated with the product of Example 2. The resulting gold solution contained 0.24 ounce troy per gallon and solution yielded a bright gold deposit equal to that of an original prime solution, and the loss of gold was less than ⅓ of that lost in the activated charcoal treatment.

Example 7

A bright nickel plating bath, contacted with activated charcoal, showed a loss in the brightner system. When the product of Example 2 was used in the same manner the loss was significantly less with no desorption of removed organic contaminates upon prolonged continuous use.

In each of Examples 5, 6 and 7 the activated charcoal and the adsorbent of this invention were added to the spent plating bath and then the resulting slurry was filtered. However, it was found that identical results could be obtained by letting the spent bath flow through a column of the adsorbent of this invention, a procedure which could be readily effected while the plating bath was being operated, by continuously recirculating a small fraction of the plating bath. In this way the bath is maintained at a highly efficient level of operation.

Example 8

An aqueous solution containing charred sucrose was divided into two identical portions. One half of the solution was passed under through 1 inch by 9 m.m. I.D. column of the product of Example 2. The other half was passed under otherwise identical conditions through a similar 1 inch by 9 m.m. internal diameter which contained an industrial mixed-oxide adsorbent. The results showed a brown coloration in the mixed-oxide adsorbent effluent, and a colorless effluent from the absorbent prepared as in Example 1.

Example 9

Four identical samples of a ten percent benzene solution of o-nitro aniline was passed through four separate 6 inch by 9 m.m. I.D. columns containing the following:

(A) The adsorbent of Example 2
(B) Commercial activated charcoal
(C) Commercial mixed-oxide adsorbent
(D) Commercial activated alumina, as referred to in Example 3
(E) Commercial acid-washed activated alumina, as referred to in Example 1.

Analysis of the effluent streams from these adsorbents showed the following ultimate adsorbent capacities in mg. analine/g. adsorbent:

(1) 0.78
(2) None (no gravity flow)
(3) 0.63
(4) 0.38
(5) 0.38

Example 10

A column of the adsorbent of Example 2 was prepared by placing 50 grams in a ⅞ inch I.D. glass column and topped with a ½ inch glass wool plug. Height to diameter ratio was 5.6. A solution of chemical grade 2,2,4-trimethyl pentane (iso-octane) containing 112 parts per million (mg./1) of sulfur as added N-butyl mercaptan was then passed by gravity downflow through the bed at a rate of 4.1 ml./min. No eluted mercaptan could be detected in the effluent after more than 2 liters of the contaminated iso-octane had passed through the column.

Example 11

One hundred grams of kole, a commercially available kole crop, was exhaustively extracted under agitation in a chopper/blender by ethyl acetate. The resultant extract, containing the majority of the plant pigments (principally chlorophyll) was evaporated to 100 ml. Ten ml. of this extract (1 gram kole/ml. of extract) were passed through a 4 inch column of the following industrial adsorbent:

(A) Chromatographic grade alumina, as referred to in Example 1
(B) Industrial decolorizing charcoal
(C) Industrial mixed-oxide adsorbent
(D) The adsorbent of Example 2

Thereafter 250 ml. of $CH_3CN$ (acetonitrile) were used as an eluant and the eluted solutions were evaporated to dryness. The color of the dry residues after evaporation were (A) Green
(B) No gravity flow
(C) Green
(D) Colorless

Example 12

A removal of colored and otherwise undesirable constituents of pyrolytic components of cigarette smokes was accomplished. The method of evaluation was to pass the vaporous effluent from a 50 mm. section of a cigarette pulled by normal human suction through a commercial bed of whitish absorbant which collected colored and presumably obnoxious components. In those cases where the adsorbent of Example 2 was placed in the effluent stream, a noticeable and sometimes dramatically diminished discoloration of the whitish absorbant was obvious. This was true in cases where the adsorbent was directly substituted for the activated charcoal in commercially available cigarettes.

Example 13

A 0.1% solution of three dyes—Sudan II, Sudan III and Azure B—was gravity fed through a one-half inch column of the following compositions with the indicated results. In each case the particle sizes and densities were similar.

| Composition | Eluate | Flow Rate |
| --- | --- | --- |
| Composition of sample 2 | Water White | 75 ml./15 min. |
| Commercial activated alumina hydrate, as referred to in Example 3. | Brown | 300 ml./15 min. |
| Commercial activated charcoal | Dark Brown | 0.5 ml./15 min. |
| Commercial magnesium silicate | Water White | 1 ml./15 min. |

Both the composition of the present invention and commercial magnesium silicate completely decolorized the dye solution. However, the composition of the present invention passed 75 times more solution during the 15-minute test. The commercial alumina hydrate passed the solution at a high rate but did not fully decolorize the dye. Commercial activated charcoal not only failed to decolorize the solution but also had a very low flow rate.

It is not intended that the invention be limited to the details of the above description and examples except as they appear in the appended claims.

What is claimed is:

1. A composition of matter for use as an adsorbent, catalyst and catalyst support consisting essentially of discrete carbon-impregnated particles of an activated alumina hydrate, said hydrate being a partially dehydrated alumina trihydrate containing a trihydrate phase and at least one transition product which includes a monohydrate phase, said particles exhibiting a surface area of at least 100 square meters per gram due to the presence of a plurality of fine pores in the particles, said carbon being present from about 2% to about 15% by weight of the composition in the form of activated carbon impregnated in said particles and as a tightly bound coating on the pore walls and exterior surfaces of each hydrate particle.

2. A composition of matter as in claim 1 wherein said alumina hydrate is an acid-washed alumina hydrate having less than about 20% loss on ignition at 1000° C. for 1 hour and a boehmite phase indicated by a boehmite X-ray diffraction peak which is 20–35% of the peak which would be obtained with pure boehmite.

3. A composition of matter as in claim 2 wherein the particle size of said alumina hydrate is such that 0.0–6% are retained on a +100 mesh screen and 90–100% are retained on a +325 mesh screen.

4. A composition of matter as in claim 1 wherein said activated alumina hydrate granules are partially dehydrated granules of α-alumina trihydrate including an α-alumina monohydrate phase and wherein said activated carbon is a thermally degraded vegetable material selected from the group consisting of sugar, molasses, and starch.

5. A composition as in claim 4 wherein said activated alumina hydrate is an acid-washed chromatographic grade alumina hydrate.

6. A process of preparing the composition of claim 1 which comprises: contacting finely divided discrete particles of an activated alumina hydrate with a liquid containing a carbonaceous material capable of thermal degradation to activated carbon so as to impregnate said discrete particles with said carbonaceous material; heating said discrete particles in an atmosphere substantially free of oxygen to a temperature sufficient to degrade said carbonaceous material to activated carbon and to volatilize the remainder of said material and insufficient to convert said activated alumina hydrate to anhydrous alumina, while maintaining the discrete nature of said particles; removing the volatilized degradation products during said heating step; and cooling the resulting discrete, activated-carbon-impregnated particles.

7. A process as in claim 6 including the step of agitating said particles during said heating step to aid in removing volatile products.

8. A process as in claim 6 including the step of mixing a finely divided solid sugar with the finely divided activated alumina hydrate to obtain a uniform blend containing, by weight, between about ½ and about 4 parts by weight of the sugar for each 10 parts of alumina hydrate and wherein said contacting step includes heating said blend to a temperature sufficient to melt said sugar in its own water of crystallization.

9. A process as in claim 6 wherein said particles are heated to 450° C. to 750° C.

10. A process as in claim 6 wherein the temperature and duration of said heating step are controlled so that said activated alumina hydrate particles retain substantially all their water of constitution.

11. In a process for reviving electroplating baths the improvement which comprises passing at least a portion of the bath through a bed of the composition of claim 1 whereby contaminants in the bath are removed therefrom by said composition without removal of appreciable quantities of metal.

References Cited
UNITED STATES PATENTS

| | | | |
|---|---|---|---|
| 1,867,435 | 7/1932 | Adair | 252—447 XR |
| 2,248,092 | 7/1961 | Korpium | 204—49 |
| 3,123,567 | 3/1964 | Ruelli et al. | 252—182 |

LEON D. ROSDOL, *Primary Examiner.*

M. WEINBLATT, *Assistant Examiner.*